(12) United States Patent
Bothe et al.

(10) Patent No.: US 6,849,210 B2
(45) Date of Patent: Feb. 1, 2005

(54) PROCESS FOR THE MANUFACTURE OF MOLDINGS

(75) Inventors: Harald Bothe, Wiesbaden (DE); Achim Müller, Grossostheim (DE); Bernhard Seiferling, Goldbach (DE)

(73) Assignee: Novartis AG, Basel (CH)

( * ) Notice: Subject to any disclaimer, the term of this patent is extended or adjusted under 35 U.S.C. 154(b) by 240 days.

(21) Appl. No.: 10/091,820

(22) Filed: Mar. 6, 2002

(65) Prior Publication Data

US 2003/0025222 A1 Feb. 6, 2003

(30) Foreign Application Priority Data

Jul. 3, 2001 (EP) .............................................. 01105708

(51) Int. Cl.$^7$ .............................. C08J 3/28; B29D 11/00
(52) U.S. Cl. ...................... 264/1.36; 264/496; 522/78; 523/106
(58) Field of Search .............................. 264/1.36, 1.38, 264/2.6, 496; 351/159, 162; 523/106; 522/78, 71

(56) References Cited

U.S. PATENT DOCUMENTS

| 4,812,173 | A | 3/1989 | Tsao et al. ..................... 134/27 |
| 5,508,317 | A | 4/1996 | Muller ......................... 522/85 |
| 5,807,585 | A | 9/1998 | Martin et al. ............... 424/613 |
| 6,008,281 | A | 12/1999 | Yang et al. .................. 524/322 |
| 6,149,842 | A | 11/2000 | Lally et al. ................. 264/1.36 |

FOREIGN PATENT DOCUMENTS

| EP | 0 486 294 A | 11/1991 |
| GB | 2 064 556 A | 6/1981 |
| GB | 2 086 400 A | 5/1982 |
| WO | WO 99/26087 | 5/1999 |

OTHER PUBLICATIONS

International Search Report.
Copy of PCT/EP Office Action (source of cited references) showing date of the action or date of dispatch.

*Primary Examiner*—Mathieu D. Vargot
(74) *Attorney, Agent, or Firm*—Jian Zhou; Robert Gorman; R. Scott Meece

(57) ABSTRACT

The invention relates to a process for the manufacture of a molding comprising the steps of
  a) preparing an aqueous solution comprising a water-soluble prepolymer having crosslinkable groups and a further polymer which is devoid of crosslinkable groups,
  b) introducing the solution obtained into a mold,
  c) triggering the crosslinking, and
  d) opening the mold such that the molding can be removed from the mold. According to the process of the invention moldings such as contact lenses may be manufactured with an improved quality and an improved overall yield.

13 Claims, No Drawings

PROCESS FOR THE MANUFACTURE OF MOLDINGS

The present invention relates to a process for the manufacture of moldings, in particular ophthalmic moldings such as contact lenses, by crosslinking a prepolymer comprising polymerizable groups in an aqueous solution, and to moldings, especially contact lenses, obtainable in accordance with that process.

The manufacture of moldings such as in particular contact lenses by crosslinking an aqueous solution of a water-soluble polyvinyl alcohol prepolymer in a mold is known, for example, from U.S. Pat. No. 5,583,163. Contact lenses manufactured by the process of the prior art reference have advantageous properties such as a good compatibility with the human cornea resulting in a high wearing comfort and the absence of irritation and allergenic effects. However, despite the good mechanical stability of the underlying polyvinyl alcohol material problems may sometimes show up in production. In particular, during mold opening and removing the contact lenses from the mold, cracks, flaws or tears may occur in the lenses or in the worst case the contact lenses even break totally. Contact lenses having such defects have to be discarded and lower the overall production yield.

Accordingly, there is a demand for a high yield manufacturing process of a contact lens material originating from a water soluble prepolymer. Surprisingly, it now has been found that the manufacturing of moldings obtainable according to U.S. Pat. No. 5,583,163 may be improved considerably, if a compatible non-reactive and, in particular, non-crosslinkable polymer is added to the aqueous prepolymer solution.

In detail, the process for the manufacture of moldings, especially contact lenses, comprises the following steps:
a) preparing an aqueous solution comprising a water-soluble prepolymer having crosslinkable groups and a further polymer which is devoid of crosslinkable groups,
b) introducing the solution obtained into a mold,
c) triggering the crosslinking, and
d) opening the mold such that the molding can be removed from the mold.

The decisive criteria determining the suitability of a prepolymer for use in the process according to the invention are that the prepolymer is soluble in water and that it comprises crosslinkable groups.

In accordance with the invention, the criterion that the prepolymer is soluble in water denotes in particular that the prepolymer is soluble in a concentration of approximately from 3 to 90% by weight, preferably approximately from 5 to 60% by weight, especially approximately from 10 to 60% by weight, in a substantially aqueous solution. Insofar as it is possible in an individual case, prepolymer concentrations of more than 90% are also included in accordance with the invention. Especially preferred concentrations of the prepolymer in solution are from approximately 15 to approximately 50% by weight, especially from approximately 15 to approximately 40% by weight, for example from approximately 25% to approximately 40% by weight.

The average molecular weight $M_n$ of the prepolymer is, within wide limits, not critical, but is in general $\geq 1000$ and preferably $\geq 2000$. A preferred molecular weight range is from about 2500 to about 2000000, especially from 5000 to 1000000, more preferred from 10000 to 200000, even more preferred from 10000 to 100000 and in particular from 10000 to 50000.

A water-soluble prepolymer according to the invention preferably comprises a suitable polymeric backbone and crosslinkable groups.

Suitable polymeric backbones include polyvinyl alcohols (PVA), polymeric diols other than PVA, polymers comprising saccharides, polymers comprising vinylpyrrolidone, polymers comprising alkyl(meth)acrylates, polymers comprising alkyl(meth)acrylates that have been substituted by hydrophilic groups, such as by hydroxy, carboxy or by amino, polymers comprising a polyalkylene oxide, or copolymers or mixtures thereof.

"Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds, such as an acrylate, methacrylate, acrylamide, methacrylamide, vinyl or styryl group. To demonstrate the large variety of suitable crosslinkable groups, there are mentioned here, merely by way of example, the following crosslinking mechanisms: radical polymerization, [2+2] cycloaddition, Diels-Alder reaction, ROMP (Ring Opening Metathesis Polymerization), vulcanization, cationic crosslinking and epoxy hardening. A preferred crosslinkable group is a group comprising a carbon-carbon double bond, in particular an acrylate, methacrylate, acrylamide or methacrylamide group.

The prepolymer used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

Preferably, the prepolymers used in the process according to the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

One group of suitable prepolymers being useful in the process of the invention are crosslinkable polyalkylene oxide derivatives as disclosed, for example in EP-A-0,932,635, EP-A-0,958,315, EP-A-0-961,941 or EP-A-1,017,734.

A particular preferred prepolymer according to the invention comprises a 1,3-diol basic structure in which a certain percentage of the 1,3-diol units have been modified to a 1,3-dioxane having in the 2-position a radical that is polymerizable but not polymerized. The polymerizable radical is especially an aminoalkyl radical having a polymerizable group bonded to the nitrogen atom.

The prepolymer according to the invention is preferably a derivative of a polyvinyl alcohol having a molecular weight of at least about 2000 that, based on the number of hydroxy groups of the polyvinyl alcohol, comprises from approximately 0.5 to approximately 80% of units of formula

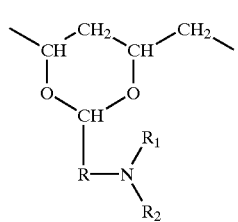
(1)

wherein R is $C_1$–$C_8$-alkylene, $R_1$ is hydrogen or $C_1$–$C_7$-alkyl and $R_2$ is an olefinically unsaturated, electron-attracting, copolymerizable radical preferably having up to 25 carbon atoms.

$R_2$ is, for example, an olefinically unsaturated acyl radical of formula $R_3$—CO—, in which $R_3$ is an olefinically unsaturated copolymerizable radical having from 2 to 24 carbon atoms, preferably from 2 to 8 carbon atoms, especially preferably from 2 to 4 carbon atoms. In another embodiment, the radical $R_2$ is a radical of formula —CO—NH—(R_4—NH—CO—O)_q—R_5—O—CO—R_3, (2), wherein q is zero or one and $R_4$ and $R_5$ are each independently $C_2$–$C_8$-alkylene, $C_6$–$C_{12}$-arylene, a saturated divalent $C_6$–$C_{10}$-cycloaliphatic group, $C_7$–$C_{14}$-arylenealkylene or $C_7$–$C_{14}$-alkylenearylene or $C_{13}$–$C_{16}$-arylenealkylenearylene, and $R_3$ is as defined above.

The prepolymer used according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula (3)

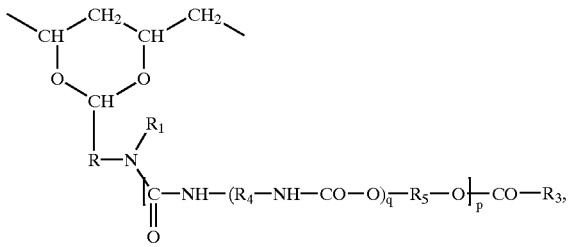

wherein R is $C_1$–$C_8$-alkylene, $R_1$ is hydrogen or $C_1$–$C_7$-alkyl, p is zero or one, q is zero or one, $R_3$ is an olefinically unsaturated copolymerizable radical having from 2 to 8 carbon atoms and $R_4$ and $R_5$ are each independently $C_2$–$C_8$-alkylene, $C_6$–$C_{12}$-arylene, a saturated divalent $C_6$–$C_{10}$-cycloaliphatic group, $C_7$–$C_{14}$-arylenealkylene or $C_7$–$C_{14}$-alkylenearylene or $C_{13}$–$C_{16}$-arylenealkylenearylene.

An alkylene radical R may be straight-chained or branched. Suitable examples include octylene, hexylene, pentylene, butylene, propylene, ethylene, methylene, 2-propylene, 2-butylene and 3-pentylene. Alkylene R has preferably 1 to 6 and especially preferably 1 to 4 carbon atoms. The meanings methylene and butylene are especially preferred.

$R_1$ is preferably hydrogen or $C_1$–$C_4$-alkyl, especially hydrogen.

Alkylene $R_4$ or $R_5$ preferably has from 2 to 6 carbon atoms and is especially straight-chained. Suitable examples include propylene, butylene, hexylene, dimethylethylene and, especially preferably, ethylene.

Arylene $R_4$ or $R_5$ is preferably phenylene that is unsubstituted or is substituted by $C_1$–$C_4$-alkyl or $C_1$–$C_4$-alkoxy, especially 1,3-phenylene or 1,4-phenylene or methyl-1,4-phenylene.

A saturated divalent cycloaliphatic group $R_4$ or $R_5$ is preferably cyclohexylene or cyclohexylene-$C_1$–$C_4$-alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R_4$ or $R_5$ is preferably phenylene, unsubstituted or substituted by $C_1$–$C_4$-alkyl or $IC_1$–$C_4$-alkoxy, and the alkylene unit thereof is preferably $C_1$–$C_8$-alkylene, such as methylene or ethylene, especially methylene. Such radicals $R_4$ or $R_5$ are therefore preferably phenylenemethylene or methylenephenylene.

Arylenealkylenearylene $R_4$ or $R_5$ is preferably phenylene-$C_1$–$C_4$-alkylene-phenylene, for example phenyleneethylenephenylene.

The radicals $R_4$ and $R_5$ are each independently preferably $C_2$–$C_6$-alkylene; phenylene, unsubstituted or substituted by $C_1$–$C_4$-alkyl; cyclohexylene; cyclohexylene-$C_1$–$C_4$-alkylene, unsubstituted or substituted by $C_1$–$C_4$-alkyl; phenylene-$C_1$–$C_4$-alkylene; $C_1$–$C_4$-alkylene-phenyl; or phenylene-$C_1$–$C_4$-alkylene-phenylene.

The olefinically unsaturated copolymerizable radical $R_3$ having from 2 to 24 carbon atoms is preferably $C_2$–$C_{24}$-alkenyl, especially $C_2$–$C_8$-alkenyl and especially preferably $C_2$–$C_4$-alkenyl, for example ethenyl, 2-propenyl, 3-propenyl, 2-butenyl, hexenyl, octenyl or dodecenyl. The meanings ethenyl and 2-propenyl are preferred, so that the group —CO—$R_3$ is preferably the acyl radical of acrylic or methacrylic acid.

The divalent group —$R_4$—NH—CO—O— is present when q is one and absent when q is zero. Prepolymers in which q is zero are preferred.

The divalent group —CO—NH—(R_4—NH—CO —O)_q—R_5—O— is present when p is one and absent when p is zero. Prepolymers in which p is zero are preferred.

In prepolymers in which p is one the index q is preferably zero. Prepolymers in which p is one, the index q is zero and $R_5$ is $C_2$–$C_8$-alkylene are especially preferred.

A preferred prepolymer used according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula (3) in which R is $C_1$–$C_6$-alkylene, p is zero and $R_3$ is $C_2$–$C_8$-alkenyl.

A further preferred prepolymer used according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula (3), in which R is $C_1$–$C_6$- alkylene, p is one, q is zero, $R_5$ is $C_2$–$C_6$-alkylene and $R_3$ is $C_2$–$C_8$-alkenyl.

A further preferred prepolymer used according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula (3) in which R is $C_1$–$C_6$-alkylene, p is one, q is one, $R_4$ is $C_2$–$C_6$-alkylene, phenylene, unsubstituted or substituted by $C_1$–$C_4$-alkyl, cyclohexylene or cyclohexylene-$C_1$–$C_4$-alkylene, unsubstituted or substituted by $C_1$–$C_4$-alkyl, phenylene-$C_1$–$C_4$-alkylene, $C_1$–$C_4$-alkylene-phenylene or phenylene-$C_1$–$C_4$-alkylene-phenylene, $R_5$ is $C_2$–$C_6$-alkylene and $R_3$ is $C_2$–$C_8$-alkenyl.

The prepolymers used according to the invention are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula (3). Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula (3).

Derivatized polyvinyl alcohols according to the invention preferably have an average molecular weight $M_n$ of at least 10,000. As an upper limit the polyvinyl alcohols may have an average molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)-ethylene structure. The polyvinyl alcohols may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols used may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohols styrene or similar customarily used comonomers.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, especially less than 20% of polyvinyl acetate units. Preferred amounts of residual acetate units in the polyvinyl alcohol derivatized in accordance with the invention, based on the sum of vinyl alcohol units and acetate units, are approximately from 3 to 20%, preferably approximately from 5 to 16% and especially approximately from 10 to 14%.

The prepolymers comprising units of formula (1) or (3) are known, for example, from U.S. Pat. No. 5,508,317 and may be prepared according to the processes described therein.

The further polymer being devoid of a polymerizable group in the aqueous solution of step a) may be any polymer which is compatible with the prepolymer. The decisive criterium determining the suitability of this further non-crosslinkable polymer is thus that it forms, within a suitable concentration range, a clear aqueous solution together with the crosslinkable prepolymer. Preferred non-crosslinkable polymers are water-soluble.

Examples of suitable polymers being devoid of a crosslinkable group are polyacrylamides, N,N-dimethyl acrylamides, polyvinyl pyrrolidones or polyoxyethylene derivatives.

A suitable polyoxyethylene derivative is, for example, a n-alkylphenyl polyoxyethylene ether, n-alkyl polyoxyethylene ether (e.g., TRITON®), polyglycol ether surfactant (TERGITOL®), polyoxyethylenesorbitan (e.g., TWEEN®), polyoxyethylated glycol monoether (e.g., BRIJ®, polyoxylethylene 9 lauryl ether, polyoxylethylene 10 ether, polyoxylethylene 10 tridecyl ether), or a block copolymer of ethylene oxide and propylene oxide (e.g. poloxamers or poloxamines).

A class of preferred non-crosslinkable polymers used in the process of this invention are polyethylene-polypropylene block copolymers, in particular poloxamers or poloxamines which are available, for example, under the tradename PLURONIC®, PLURONIC-R®, TETRONIC®, TETRONIC-R® or PLURADOT®.

Poloxamers are triblock copolymers with the structure PEO-PPO-PEO (where "PEO" is poly(ethylene oxide) and "PPO" is poly(propylene oxide). A considerable number of poloxamers is known, differing merely in the molecular weight and in the PEO/PPO ratio; Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. The poloxamers may be used in the process of the invention irrespective of their PEO/PPO ratio; for example, poloxamer 101 having a PEO/PPO weight ratio of about 10/90 and poloxamer 108 having a PEO/PPO weight ratio of about 80/20 both have been found to be valuable as non-crosslinkable polymer in the aqueous solution according to step a).

The order of polyoxyethylene and polyoxypropylene blocks can be reversed creating block copolymers with the structure PPO-PEO-PPO, which are known as PLURONIC-R® polymers.

Poloxamines are polymers with the structure (PEO-PPO)$_2$—N—(CH$_2$)$_2$—N—(PPO-PEO)$_2$ that are available with different molecular weights and PEO/PPO ratios. Again, the order of polyoxyethylene and polyoxypropylene blocks can be reversed creating block copolymers with the structure (PPO-PEO)$_2$—N—(CH$_2$)$_2$—N—(PEO-PPO)$_2$, which are known as TETRONIC-R® polymers.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

The weight average molecular weight of the polyethylene/ 'polypropylene block copolymers may vary within wide limits. An average molecular weight of, for example, from about 1000 to 20000, preferably from 1000 to 15000, more preferably from 1000 to 8000 and in particular from 1000 to 5000 has proven valuable for the use in the process of the invention.

A preferred group of non-crosslinkable polymers in step a) of the present invention are poloxamers of any PEO/PPO ratio and number average molecular weight. Particularly preferred poloxamers are those of a weight average molecular weight of from about 1000 to 8000 and especially from 1000 to 5000.

A further preferred group of non-crosslinkable polymers in step a) of the present invention are polyacrylamides, wherein the number average molecular weight may vary within wide limits. For example a polyacrylamide with a weight average molecular weight of from 1000 to 1000000, preferably from 1000 to 500000 and in particular from 1500 to 250000 has proven as valuable within the process of the invention.

The polymer being devoid of a crosslinkable group is present in the aqueous solution of step a) in an amount of, for example, up to 10% by weight, preferably up to 5% by weight, more preferably from 0.05 to 5% by weight, even more preferably from 0.1 to 4% by weight and in particular from 0.5 to 3% by weight, each based on the entire weight of the aqueous solution.

One preferred embodiment of the invention concerns an aqueous solution according to step a) comprising <1% by weight relative to the entire solution of the non-crosslinkable polymer.

A further preferred embodiment of the invention concerns an aqueous solution according to step a) comprising ≧1% by weight, preferably from 1 to 5% by weight and in particular from 1 to 3% by weight each relative to the entire solution of the non-crosslinkable polymer.

The preparation of an aqueous solution comprising a water-soluble prepolymer that comprises crosslinkable groups and a further polymer which is devoid of crosslinkable groups according to step a) can be carried out in a manner known per se. For example, the prepolymer in first of all synthesized in an aqueous solution or is isolated, for example, in pure form, which means free from undesired constituents, and is then dissolved in an aqueous medium. To this solution is then added the further non-crosslinkable polymer or an aqueous solution thereof; the further non-crosslinkable polymer or the solution thereof are likewise preferably in pure form, i.e. free from undesired constituents. The mixture is then stirred at room temperature until a clear homogeneous solution is obtained. If necessary the mixture may be heated, for example to about 50 to 80° C., in order to accelerate the formation of a homogeneous solution.

Within the scope of this invention, aqueous solutions of the prepolymer and the further non-crosslinkable polymer comprise especially solutions of the components in water, in aqueous salt solutions, especially in aqueous salt solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol. Solutions of the prepolymer and the further non-crosslinkable polymer in water or in aqueous salt solutions are preferred.

The aqueous salt solutions are advantageously solutions of physiologically tolerable salts, such as buffer salts customary in the field of contact lens care, for example phosphate salts, or isotonizing agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The aqueous solution of the prepolymer and the further non-crosslinkable polymer defined hereinbefore is preferably a pure solution which means a solution which is free or essentially free from undesired constituents, for example, free from monomeric, oligomeric or polymeric starting compounds used for the preparation of the prepolymer, and/or free from secondary products formed during the preparation of the prepolymer. Especially preferred examples of such solutions are a solution of the prepolymer and the further non-crosslinkable polymer in pure water or in an artificial lacrimal fluid, as defined hereinbefore.

In addition, the aqueous solution according to step a) may contain an additional vinylic comonomer. The vinylic comonomer which, in accordance with the invention, may be used in addition in the crosslinking, may be hydrophilic or hydrophobic, or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denotes a monomer that typically yields as homopolymer a polymer that is water-insoluble and can absorb less than 10% by weight of water.

Generally, approximately from 0.01 to 80 units of a typical vinylic comonomer react per unit of formula (1) or (3).

If a vinylic comonomer is used, the crosslinked polymers according to the invention preferably comprise approximately from 1 to 15%, especially preferably approximately from 3 to 8%, of units of formula (1) or (3), based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula (1), especially from 1 to 30 units per unit of formula (1), and especially preferably from 5 to 20 units per unit of formula (1).

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerization with polyvinyl alcohol comprising groups of formula (1).

Suitable hydrophobic vinylic comonomers include, without the list being exhaustive, $C_1$–$C_{18}$-alkyl acrylates and methacrylates, $C_3$–$C_{18}$alkyl acrylamides and methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers, in which the alkyl moiety contains from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like. $C_1$–$C_4$alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinylbutyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethyidisiloxane.

Suitable hydrophilic vinylic comonomers include, without the list being exhaustive, hydroxy-substituted $C_1-C_6$-alkyl acrylates and methacrylates, acrylamide, methacrylamide, $C_1-C_4$-alkyl acrylamides and methacrylamides, ethoxylated acrylates and methacrylates, hydroxy-substituted $C_1-C_6$-alkyl acrylamides and methacrylamides, hydroxy-substituted $C_1-C_6$-alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-$C_1-C_6$-alkylamino- or di-$C_1-C_6$-alkylamino-$C_1-C_6$-alkyl acrylates and methacrylates, allylalcohol and the like. Hydroxy-substituted $C_2-C_4$alkyl(meth)-acrylates, five- to seven-membered N-vinyl lactams, N,N-di-$C_1-C_4$alkyl (meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide, and the like.

Preferred hydrophobic vinylic comonomers are methyl methacrylate and vinyl acetate. Preferred hydrophilic vinylic comonomers are 2-hydroxyethyl methacrylate, N-vinylpyrrolidone and acrylamide.

The aqueous solution according to step a) preferably does not contain a comonomer.

The aqueous solution of step a), in addition to water, may contain a further solvent, for example an alcohol, such as methanol, ethanol or n- or iso-propanol, or a carboxylic acid amide, such as N,N-dimethylformamide, or dimethyl sulfoxide. The aqueous solution preferably contains no further solvent.

In the case of photocrosslinking in step c), it is appropriate to add a photoinitiator to the aqueous solution, which can initiate radical crosslinking. Examples thereof are familiar to the person skilled in the art and suitable photoinitiators that may be mentioned specifically are benzoin methyl ether, 1-hydroxycyclohexylphenyl ketone, or Darocure® or Irgacure® types, for example Darocure® 1173 or Irgacure® 2959. The amount of photoinitiator may be selected within wide limits, an amount of up to 0.05 g/g of prepolymer and especially of up to 0.003 g/g of prepolymer having proved beneficial.

The viscosity of the prepolymer solution of step a) is, within wide limits, not critical, but the solution should preferably be a flowable solution that can be deformed strain-free.

The aqueous solution obtained in step a) is then introduced in a mold. Methods that are known per se, such as, especially, conventional metering in, for example by dropwise introduction, may be used to introduce the resulting solution into a mold. Suitable molds are generally customary contact lens molds as known in the state of the art. Thus, the contact lenses according to the invention can be manufactured, for example, in a manner known per se, for example in a conventional "spin-casting mold", as described, for example, in U.S. Pat. No. 3,408,429, or preferably by the so-called Full-Mold process in a static mold, for example as described, in U.S. Pat. No. 4,347,198. Appropriate molds are made, for example, from polypropylene. Glass, for example Quartz or sapphire glass, and metals are suitable materials for re-usable molds. Further examples of moldings according to the invention, besides contact lenses, are ophthalmic moldings of all kinds, for example intraocular lenses, artificial corneas or eye bandages; biomedical moldings, for example moldings that can be used in surgery, such as heart valves, artificial arteries or the like; and also films or membranes, for example membranes for diffusion control, photostructurizable films for information storage, or photoresist materials, for example membranes or moldings for etch resist or screen printing resist.

The crosslinking of the prepolymers in the mold according to step c) may be carried out, for example, by the action of heat or by irradiation, photocrosslinking using, for example, visible light, UV light or ionising radiation, such as gamma radiation or X-radiation, in particular using UV light, being preferred. The photocrosslinking can be carried out according to the invention in a very short time, for example in less than five minutes, preferably in ≦1 minute, especially in 1 to 60 seconds, especially preferably, in 2 to 30 seconds.

The photocrosslinking is carried out preferably directly from an aqueous solution of the prepolymers according to the invention, which can be obtained by the preferred purification step, ultrafiltration, after the addition of the non-crosslinkable further polymer and, where appropriate an additional vinylic comonomer. For example, an approximately 15 to 40% aqueous solution can be photocrosslinked.

The opening of the mold after the crosslinking such that the molding can be removed from the mold can be carried out in a manner known per se. Whereas in processes that have been proposed in the state of the art it is usually necessary at that point for purification steps to follow, for example extraction, and also steps for the hydration of the resulting moldings, especially contact lenses, such steps are not necessary in the process according to the invention.

Since the solution of the prepolymer preferably does not comprise any undesired low-molecular constituents, the crosslinked product, too, does not comprise any such constituents. Therefore subsequent extraction is not necessary. Since the crosslinking is carried out in a substantially aqueous solution, subsequent hydration is not necessary. Those two advantages mean, inter alia that a complicated after-treatment of the resulting moldings, especially contact lenses, is dispensed with. The contact lenses obtainable in accordance with the process according to the invention are therefore, according to an advantageous embodiment, distinguished by the fact that they are suitable for their intended use without extraction. "Intended use" in this context means especially that the contact lenses can be used in the human eye. The contact lenses obtainable in accordance with the process according to the invention are, according to an advantageous embodiment, also distinguished by the fact that they are suitable for their intended use without hydration.

In case of contact lenses the moldings have to be autoclaved in a manner known per se after their removal from the molds. Contact lenses prepared from the preferred PVA materials comprising units of the above formula (1) or (3), are preferably further treated according to the autoclaving process as described in EP-A-0,900,394. The autoclaving process comprises, for example, the following steps:

i) transferring the hydrogel molding obtained according to step d) that contains hydrolytically removable side groups, in particular acetate groups, to a container, ii) filling up the container containing the hydrogel molding with a basic buffer solution, iii) closing the container, and iv) autoclaving the container containing the hydrogel molding and the basic buffer solution at a temperature of at least 100° C., wherein, during the autoclaving, the hydrolytically removable side groups are essentially completely removed, the container contents are sterilized, and the basic buffer solution is converted into a physiologically acceptable aqueous solution that is substantially isotonic and pH-compatible with the lacrimal fluid of the human eye.

The details of the above autoclaving process are disclosed, for example, in EP-A-0,900,394, see, for example, working examples 1, 2 and 3 therein.

The process according to the invention is outstandingly well suited to the economical manufacture of a large number of moldings, such as contact lenses, in a short time. The contact lenses obtainable in accordance with the process according to the invention have inter alia the advantages over the contact lenses known from the state of the art that they can be used for their intended use without subsequent treatment steps, such as extraction or hydration.

The contact lenses according to the invention, especially those comprising a polymer based on a prepolymer comprising units of formula (1) or (3), can be produced in a very simple and efficient manner compared with the state of the art. This is as a result of several factors. First, the starting materials can be obtained or produced at a favorable cost. Secondly, there is the advantage that the prepolymers are stable, so that they can be subjected to a high degree of purification. It is therefore possible to use for the crosslinking a prepolymer that requires practically no subsequent purification, such as especially a complicated extraction of unpolymerized constituents. Also, the polymerization can be carried out in aqueous solution, so that a subsequent hydration step is not necessary. The photopolymerization occurs within a short period, so that the process for manufacturing the contact lenses according to the invention can be organized to be extremely economical from that point of view also.

Furthermore, the addition even of a small amount of a compatible non-crosslinkable polymer to the prepolymer solution in step a) surprisingly decreases the force needed to open the mold after crosslinking. Due to a decreased adherence of the contact lens to the mold surface, the mechanical stress on the contact lens during the mold opening is lowered.

The reduced mechanical stress in turn results in a decreased rate of damaged contact lenses. Accordingly, the overall yield of contact lenses in the process of the invention is considerably increased relative to the process as disclosed in U.S. Pat. No. 5,583,163.

All of the advantages mentioned above naturally apply not only to contact lenses but also to other moldings according to the invention. Taking into account all the various advantageous aspects in the manufacture of the moldings according to the invention it can be seen that the moldings according to the invention are especially suitable as mass-produced articles, such as, for example, contact lenses that are worn for a short time and then replaced by new lenses.

The contact lenses made according to the process of the invention have a wide range of unusual and extremely advantageous properties, which include, for example, their excellent compatibility with the human cornea, which is based on a balanced relationship of water content, oxygen permeability and mechanical properties. Moreover, the addition of the non-crosslinkable polymer to the prepolymer solution in step a) surprisingly improves the quality, for example the wearing comfort including the end-of-day comfort, of the contact lenses relative to contact lenses manufactured according to the same process without the addition of such a non-crosslinkable polymer. In particular, contact lenses obtained according to the process of the invention with a concentration of $\geq 1\%$ by weight relative to the entire formulation of a non-crosslinkable polymer in step a) are felt to be very comfortable by contact lens wearers especially during long wearing times.

The contact lenses according to the invention furthermore exhibit a high degree of dimensional stability. No changes in shape are detected even after autoclaving at, for example, about 120° C.

In the Examples which follow, amounts are by weight, unless specified otherwise, and temperatures are given in degrees Celsius.

EXAMPLE 1 (COMPARISON)

40 g (1.0 mol) of sodium hydroxide are dissolved in 100 g of water and 200 g of ice in a 1-liter reactor having a stirrer and a cooling system. The sodium hydroxide solution is cooled to 10° C., and 105.1 g (1.0 mol) of aminoacetaldehyde dimethyl-acetal and 10 mg of the inhibitor 4-hydroxy-2,2,6,6-tetramethylpiperidin-1-oxide are added. 99.5 g (1.1 mol) of acrylic acid chloride are slowly added to that solution at 10° C. over a period of 2 hours. The pH value drops slowly and ultimately is adjusted to 7. According to GC, amine is no longer present. The reaction mixture is saturated with sodium chloride and extracted three times with 200 ml of tert-butyl methyl ether. The organic phase is dried, filtered and concentrated using a rotary evaporator. The resulting oil is extracted three times with petroleum ether and then dried again using a rotary evaporator. 130 g of acrylamido-acetaldehyde dimethylacetal (81% of theory) are obtained in the form of an oil; the product is 99% according to GC.

EXAMPLE 2 (COMPARISON)

General Method for the Preparation of a PVA Prepolymer Having a Low Acetate Content 300 g of PVA (for example Moviol Hoechst 4-88) are placed in a 2-liter double-jacket reactor having a stirrer and thermometer, 800 g of deionised water are added and the mixture is heated to 95° C. with stirring. After one hour, everything has dissolved to produce a clear solution which is cooled to 20° C. 27 g (0.155 mol) of methacrylamidoacetaldehyde dimethyl acetal (synthesis see EP-A-0,641,806, Example 11), 200 g of concentrated hydrochloric acid (37%) and sufficient deionised water (in this specific case: 673 g) are added to produce a total of 2000 g of reaction solution. The mixture is stirred at 20° C. After 20 hours, a sample of the reaction solution is titrated with sodium hydroxide and the degree of hydrolysis of the PVA is ascertained: HCl= 1.034 meq/g, acetic acid=0.265 meq/g corresponding to 3.5 mol % residual acetate. The reaction mixture is stirred for a further 2 hours at 25° C. and titrated again. HCl=1.034 meq/g, acetic acid=0.277 meq/g, corresponding to 2.93 mol % residual acetate.

The isolation can be carried out by means of ultrafiltration: the reaction mixture is cooled to 15° C. and adjusted to pH 7 with aqueous NaOH (5%). The polymer solution is filtered by way of a 0.45 μm filter and purified by means of ultrafiltration. The ultrafiltration is carried out using a 1-KD-Omega membrane produced by Filtron. Ultrafiltration is carried out to a residual sodium chloride content of 0.002%. 1800 g of a 14.02% polymer solution (86% of theory) are obtained; N-content (Kjeldahl determination)=0.741%, acetate content (after titration)=0.605 meq/g corresponding to 2.91 mol %, inherent viscosity: 0.327, double bonds: 0.61 meq/g (ascertained by microhydrogenation), free hydroxy groups (ascertained by reacetylation): 18.13 meq/g, GPC analysis (in water): Mw=22007, Mn=9743, Mw/Mn=2.26.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone, and dried. The product so obtained is comparable with that obtained by ultrafiltration.

EXAMPLE 3 (COMPARISON)

Preparation of a PVA Prepolymer Solution 31 g of the acetal of Example 1 are reacted according to the preparative method according to Example 2.

prepolymer data (sol): N content: 1.41%, acetal content: 1.00 meq/g, acetate content: 6.2 mol %, solids content: 30% in the sol state

EXAMPLES 4a–4i

Preparation of a PVA Prepolymer Solution Comprising a Non-Reactive Polymer

To the prepolymer solution obtained according to Example 3 is added with stirring an amount of non-reactive polymer as indicated in the Table 1 below. Stirring is continued until a clear homogeneous solution is obtained in each case (about 20–90 minutes). If necessary the mixture may be heated, for example to about 50 to 80° C., in order to accelerate the formation of a homogeneous solution.

TABLE 1

| Example | Polymer | Concentration [% by weight based on the entire solution] |
|---|---|---|
| 4a | poloxamer 108 | 0.1 |
| 4b | poloxamer 108 | 0.5 |
| 4c | poloxamer 108 | 1.0 |
| 4d | poloxamer 108 | 2.0 |
| 4e | poloxamer 101 | 3.0 |
| 4f | polyacrylamide[1] | 1.0 |
| 4g | polyacrylamide[1] | 2.0 |
| 4h | polyacrylamide[2] | 1.0 |
| 4i | polyacrylamide[2] | 2.0 |

[1] Molecular weight $M_n$ = 1,500
[2] Molecular weight $M_n$ = 200,000

EXAMPLE 5

Preparation of a Contact Lens 0.05 to 0.3% (based on polymer content) of the photoinitiator Irgacure 2959 is added to each of the prepolymer solution obtained according to Examples 3 and 4a to 4i. The solution is transferred to transparent contact lens molds of polypropylene and irradiated therein for 6 seconds using a 200W Oriel UV lamp (150 mW/cm$^2$). The molds are then opened and the lenses are removed. The lenses are in each case transparent.

EXAMPLE 6–6i

Determination of the Relative Mold Opening Force (Quartz and Glass Molds)

The force needed to open the mold after the contact lens manufacture in Example 5 is measured. The measurements are done with a tensile testing machine (Zwick Z 2.5). One mold half is fixed rigidly, the other mold half is in a double cardanic mounting to enable force-free alignment.

The Table 2 below shows the relative mold opening force needed to open the molds after irradiating a prepolymer solution according to either of Examples 3 and 4a–4i.

TABLE 2

| Example | Prepolymer solution from Example | relative mold opening force [%] |
|---|---|---|
| 6 (comparison) | 3 | 100 |
| 6a | 4a | 70 |
| 6b | 4b | 36 |
| 6c | 4c | 32 |
| 6d | 4d | 29 |
| 6e | 4e | 45 |
| 6f | 4f | 67 |
| 6g | 4g | 40 |
| 6h | 4h | 70 |
| 6i | 4i | 41 |

EXAMPLE 7

Autoclaving a Contact Lens

The contact lenses obtained according to Example 5 are each autoclaved in 0.5 ml of Na$_2$HPO$_4$ solution (135 mmol/l Na$_2$HPO$_4$) for 45 min. at 122° C. in a conventional PP packaging having an aluminium sealing foil.

After autoclaving, the diameter and the E-modulus of the contact lenses are determined. No significant differences in lens diameter and E-modulus can be identified between lenses made from a solution of Example 3 and from a solution of either of Examples 4a–4i.

In addition, the wearing comfort of the contact lenses is assessed in a clinical study. The test persons rate the contact lenses obtained according to Examples 4c–4i and especially those of Examples 4d–4i as very comfortable and point out the excellent end-of-day comfort.

EXAMPLES 8–8d

Automated Lens Manufacture

Contact lenses are manufactured according to the automated process disclosed in EP-A-0,969,956 using the prepolymer solutions of Examples 3, 4a, 4b, 4c and 4d. The relative rate of lens defects is assessed as follows:

TABLE 3

| Example | Prepolymer solution from Example | relative rate of lens defects [%][1] |
|---|---|---|
| 8 (comparison) | 3 | 100 |
| 8a | 4a | 62 |
| 8b | 4b | 69 |
| 8c | 4c | 52 |
| 8d | 4d | 43 |

[1] all lens defects are assessed which are visible using a 13 fold magnification The above Table 3 reveals that the overall yield of contact lenses obtained according to the process of the invention is considerably higher than that obtained according to the prior art process due to a reduced rate of lens defects.

What is claimed is:

1. Process for the manufacture of a molding comprising the steps:
   a) preparing an aqueous solution comprising,
      (i) a water-soluble prepolymer having crosslinkable groups, wherein the water-soluble prepolymer is present in the aqueous solution in an amount of from 5% to 60% by weight, and
      (ii) a further compatible polymer in an amount sufficient to reduce mold opening forces required for opening a closed mold in which a molding is to be produced from the aqueous solution, wherein the further polymer is present in the aqueous solution in an amount of from 0.1% to 10% by weight, wherein the further polymer is devoid of crosslinkable groups, and wherein the further polymer forms a clear aqueous solution with the prepolymer having crosslinkable groups,
   b) introducing the solution obtained into a mold,
   c) triggering the crosslinking, and
   d) opening the mold such that the molding can be removed from the mold.

2. A process according to claim 1, wherein the crosslinkable prepolymer having crosslinkable groups is a derivative of a polyvinyl alcohol having a molecular weight of at least about 2,000 that, based on the number of hydroxy groups of the polyvinyl alcohol, comprises from approximately 0.5 to approximately 80% of units of formula

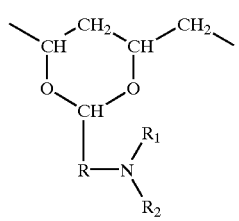

(1)

wherein R is $C_1$–$C_8$-alkylene, $R_1$ is hydrogen or $C_1$–$C_7$-alkyl and $R_2$ is an olefinically unsaturated, electron-attracting, copolymerizable radical preferably having up to 25 carbon atoms.

3. The process of claim 2, wherein $R_2$ is a radical of formula

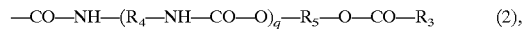

(2), wherein q is zero or one and $R_4$ and $R_5$ are each independently $C_2$–$C_8$-alkylene, $C_8$–$C_{12}$-arylene, a saturated divalent $C_6$–$C_{10}$-cycloaliphatic group, $C_7$–$C_{14}$-arylenealkylene or $C_7$–$C_{14}$-alkylenearylene or $C_{13}$–$C_{16}$-arylenealkylenearylene, and $R_3$ is $C_2$–$C_8$-alkenyl.

4. A process according to claim 2, wherein R is $C_1$–$C_4$-alkylene, $R_1$ is hydrogen or $C_1$–$C_4$-alkyl, and $R_2$ is a radical $R_3$—CO—, in which $R_3$ is $C_2$–$C_4$-alkenyl.

5. A process according to claim 2, wherein the further polymer being devoid of a crosslinkable group in step a) is a polyacrylamide, N,N-dimethyl acrylamide, polyvinyl pyrrolidone or a polyoxyethylene derivative.

6. A process according to claim 2, wherein the further polymer being devoid of a crosslinkable group in step a) is a polyethylene-polypropylene block copolymer.

7. A process according to claim 2, wherein the further polymer being devoid of a crosslinkable group in step a) is present in the aqueous solution in an amount of from 0.5 to 10% by weight, based on the entire weight of the aqueous solution.

8. A process according to claim 2, wherein according to step c) the prepolymer is photocrosslinked in the presence of a photoinitiator.

9. A process according to claim 8, wherein the photocrosslinking is carried out for a time period of less than five minutes.

10. A process according to claim 2, wherein the molding is a biomedical device.

11. A molding obtained by the process of claim 1.

12. A process according to claim 1, wherein the further polymer being devoid of a crosslinkable group in step a) is present in the aqueous solution in an amount of from 0.5 to 3% by weight, based on the entire weight of the aqueous solution.

13. A process according to claim 10, wherein the biomedical molding is a contact lens, intraocular lens or artificial cornea.

* * * * *